United States Patent
Ohtsu et al.

(10) Patent No.: US 6,364,427 B1
(45) Date of Patent: Apr. 2, 2002

(54) AUTOMOTIVE BRAKE CONTROL SYSTEM

(75) Inventors: Nobuyuki Ohtsu; Toru Kojima; Yoshiyuki Izu, all of Kanagawa (JP)

(73) Assignees: Unisia Jecs Corporation, Atsugi; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/577,664

(22) Filed: May 25, 2000

(30) Foreign Application Priority Data

May 25, 1999 (JP) .......................................... 11-145218

(51) Int. Cl.$^7$ ................................ B60T 8/66; B60T 8/64
(52) U.S. Cl. ....................... 303/3; 303/173; 303/122.06; 303/20
(58) Field of Search ................................ 303/157, 166, 303/167, 168, 171, 173, 122.06, 122.04, 122.05, 3, 20

(56) References Cited

U.S. PATENT DOCUMENTS

| | | | | |
|---|---|---|---|---|
| 4,955,671 A | * | 9/1990 | Higashimura | 303/92 |
| 5,043,898 A | * | 8/1991 | Yoshino | 364/426.02 |
| 5,138,556 A | * | 8/1992 | Yoshino | 364/426.02 |
| 5,427,441 A | * | 6/1995 | Otsu | 303/100 |
| 5,752,751 A | * | 5/1998 | Nakaura et al. | 303/122.06 |
| 6,170,923 B1 | * | 1/2001 | Iguchi et al. | 303/122.04 |

FOREIGN PATENT DOCUMENTS

| | | | | |
|---|---|---|---|---|
| JP | 2106461 A | * | 4/1990 | 303/171 |
| JP | 154466 A | * | 5/1992 | 303/122.05 |
| JP | 5254420 A | * | 10/1993 | 303/122.06 |
| JP | 664522 A | * | 3/1994 | 303/122.05 |
| JP | 10-147232 | * | 6/1998 | |

* cited by examiner

Primary Examiner—Matthew C. Graham
Assistant Examiner—Melody M. Burch
(74) Attorney, Agent, or Firm—Foley & Lardner

(57) ABSTRACT

There is provided an automotive brake control system capable of executing ABS control (skid control), in which when an abnormality such as superimposition of noise on the output of a wheel speed sensor occurs, a pseudo vehicle body speed is generated by wheel-speed sensor signal excluding an abnormal wheel-speed sensor signal. The automotive brake control system includes an abnormality judgment section which determines whether an abnormal wheel-speed sensor signal is included in the wheel-speed sensor signals. The abnormality judgment section cooperates with a pseudo vehicle body speed generating section for generating a pseudo vehicle body speed based on the wheel-speed sensor signals except the abnormal wheel-speed sensor signal when the abnormality judgment section determines that the abnormal wheel-speed signal is present. The abnormality judgment section includes a pressure-reduction time counter which measures a pressure-reduction time from a time when a pressure-reduction operating mode is initiated due to a rise in the pseudo vehicle speed during the skid control, and an abnormality decision circuitry which determines that the abnormal wheel-speed sensor signal is present when the pressure-reduction time exceeds a predetermined time period.

8 Claims, 8 Drawing Sheets

AUTOMOTIVE BRAKE CONTROL SYSTEM

BACKGROUND OF THE INVENTION

1. Field of the Invention

The present invention relates to an automotive brake control system which carries out what we call ABS control (skid control) for controlling a brake fluid pressure to prevent wheels from locking during braking. More particularly, it relates to a technology for processing performed when abnormality occurs due to noise superimposed on the output of wheel speed sensor or external turbulence caused by poor installation.

2. Description of Related Art

For the brake control system for carrying out ABS control, a pseudo vehicle body speed is estimated from the wheel speed of each wheel, and the brake fluid pressure (wheel-brake cylinder pressure) is automatically reduced, held, and built up based on this pseudo vehicle body speed and the wheel speed of each wheel to prevent wheels from locking during braking. Thereby, the steering ability (steering control) and running stability (vehicle stability) are secured, and at the same time the braking distance is shortened.

For such an automotive brake control system, the detection accuracy of wheel speed is important in executing the aforementioned ABS control, and if an abnormality of a wheel speed sensor occurs, it is difficult to execute the normal ABS control. Therefore, a brake control system has been proposed which carries out control corresponding to a detected abnormality if abnormality of wheel speed sensor occurs.

As such a conventional brake control system, a brake controller disclosed in Unexamined Japanese Patent Publication No. 10-147232 has been known.

In the system disclosed in the Japanese Patent Provisional Publication No. 10-147232, the controller has an abnormality detecting means for detecting abnormality of each wheel, and for calculating estimated vehicle body speed from each wheel speed of wheels other than the wheel in which abnormality is detected with respect to estimated vehicle body speed calculating means at the time of abnormality detection. This abnormality detecting means is configured so that if the wheel speed calculated in this control cycle of the same wheel increases as compared with the wheel speed calculated in the previous control cycle exceeding a set value $\alpha$, and increases as compared with the estimated vehicle body speed (pseudo vehicle body speed) exceeding a set value $\beta$, the wheel speed calculated in this control cycle on this wheel is judged to be abnormal. Further, it is configured so that when abnormality is found, the estimated vehicle body speed is calculated from the wheel speeds excluding a wheel on which abnormality is found.

In this conventional system, therefore, in the case where noise is superimposed on the output of wheel speed sensor, and the output is increased, when the wheel speed is higher than the previous value by $\alpha$ and more, and higher than the estimated vehicle body speed by $\beta$ and more, abnormality is found, so that this wheel speed is not used in estimating the vehicle body speed, and the estimated vehicle body speed is not higher than the actual vehicle body speed. Thus, there is a reduced possibility that skid control is undesirably executed and the pressure reduction is undesirably executed. Additionally, it is possible to prevent the system from erroneously determining whether or not the abnormality is present when the wheel speed is rapidly recovered from a skidding state, thereby preventing the skid control or pressure-reduction mode from being executed wastefully.

In the system disclosed in the Japanese Patent Provisional Publication No. 10-147232, when abnormality such that noise is superimposed on the wheel speed sensor occurs, the vehicle body speed is estimated excluding a wheel on which abnormality occurs, by which the control accuracy can be improved. However, since the judgment of abnormality of wheel speed sensor is made by a comparison of the output value of wheel speed sensor and pseudo vehicle body speed and a comparison with the previous output value, problems described below may be caused.

In generating or producing the pseudo vehicle body speed, in the first cycle of control in which ABS control (skid control) is initiated, each wheel tends to be locked, so that an accurate wheel speed cannot be obtained. Therefore, apart from an expensive control system having a longitudinal acceleration sensor, in an inexpensive control system having no longitudinal acceleration sensor, calculation is made by subtracting a fixed value from the previous pseudo vehicle body speed.

Thereupon, in particular, on a road with a low coefficient of friction (hereinafter referred to as low-$\mu$ road), the deceleration of vehicle body speed is low, so that a pseudo vehicle body speed Vi determined by subtracting a fixed value in this manner is sometimes lower than the actual vehicle body speed. Contrarily, when ABS control for avoiding the locking of wheel is carried out, the wheel speed is once increased to a value substantially equal to the actual vehicle body speed by processing of pressure reduction. As a result, the wheel speed becomes higher than the pseudo vehicle body speed. When this speed exceeds the aforementioned value $\beta$, abnormality may be found mistakenly.

When the driving wheel slips and thus the wheel speed of the driving wheel becomes higher than the pseudo vehicle body speed, likewise, abnormality may be found mistakenly.

SUMMARY OF THE INVENTION

The present invention has been made to solve above problems, and accordingly an object thereof is to prevent mistaken judgment on a low-$\mu$ road and mistaken judgment due to slip of a driving wheel, thereby improving the abnormality judgment accuracy and upgrading the control quality in a brake control system capable of executing ABS control, in which when abnormality such as superimposition of noise on the output of a wheel speed sensor occurs, a pseudo vehicle body speed is generated on the basis of wheel speeds excluding an abnormal wheel.

In order to accomplish the aforementioned and other objects of the present invention, an automotive brake control system comprises a hydraulic brake unit connected to each individual wheel cylinder, for individually controlling a wheel-cylinder pressure to the individual wheel cylinder, wheel speed sensors detecting wheel speeds of each of road wheels, and a control unit being configured to be electrically connected to the wheel-speed sensors and the hydraulic brake unit, for processing wheel-speed sensor signals from the wheel-speed sensors and generating a command signal to the hydraulic brake unit to prevent wheel lock-up, the control unit comprising a pseudo vehicle body speed generating section generating a pseudo vehicle body speed based on the wheel-speed sensor signals, a skid control section executing skid control based on a difference between the pseudo vehicle body speed and each of the wheel-speed sensor signals, to prevent wheel lock-up during braking by momentarily reducing the wheel-cylinder pressure through the hydraulic brake unit, and an abnormality judgment section determining whether an abnormal wheel-speed sensor signal is included in the wheel-speed sensor signals from the wheel-speed sensors, and cooperating with the pseudo vehicle body speed generating section for generating the pseudo vehicle body speed based on the wheel-speed sensor signals except the abnormal wheel-speed sensor signal when the abnormality judgment section determines that the abnormal wheel-speed sensor signal is present, the abnormality judgment section including a pressure-reduction time counter which measures a pressure-reduction time from a time when a pressure-reduction operating mode is initiated due to a rise in the pseudo vehicle speed during the skid control, and an abnormality decision circuitry which determines that the abnormal wheel-speed sensor signal is present when the pressure-reduction time exceeds a predetermined time period.

DETAILED DESCRIPTION OF THE PREFERRED EMBODIMENTS

An embodiment of the present invention will now be described with reference to the accompanying drawings.

Figure 2:
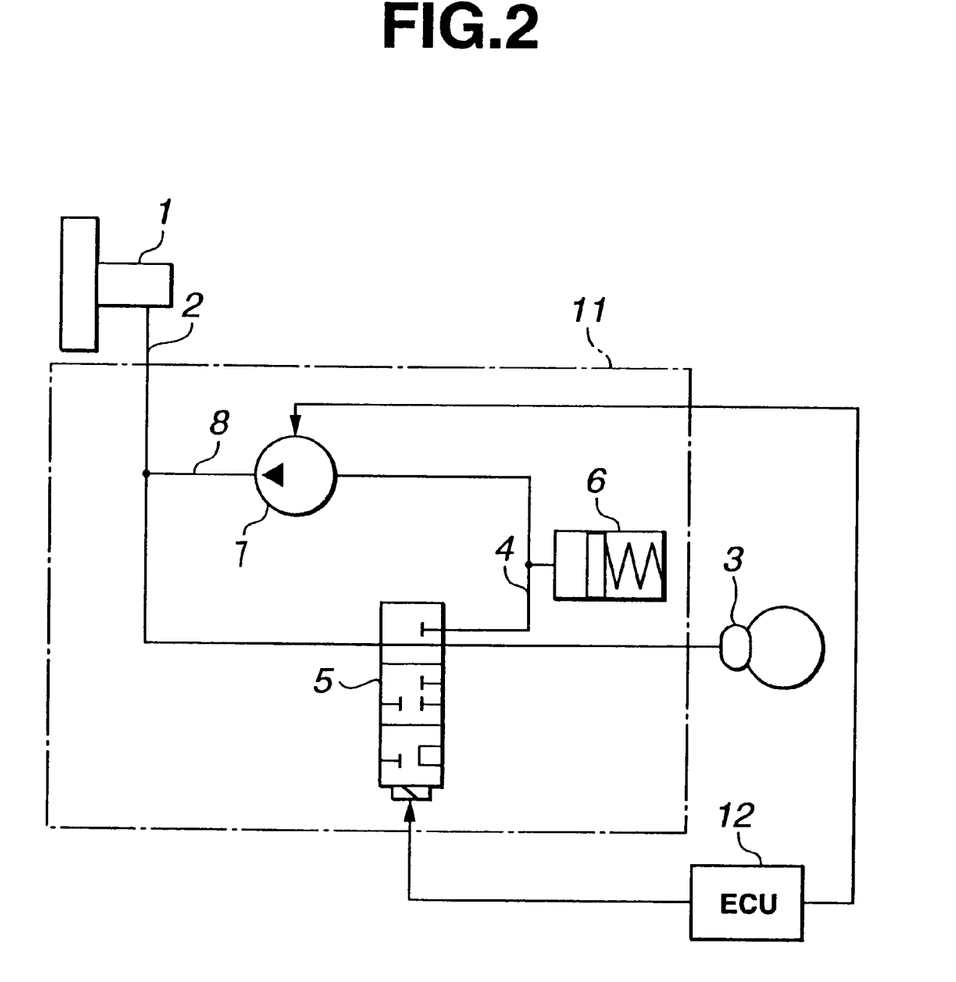
FIG. 2 is a hydraulic circuit diagram showing an essential part of an embodiment.

FIG. 2 is a schematic view showing an essential part of a hydraulic brake system in accordance with an embodiment. In FIG. 2, reference numeral 1 denotes a master cylinder. This master cylinder 1 is configured so that a fluid pressure is generated when a driver depresses a brake pedal.

The master cylinder 1 is connected to a wheel cylinder 3 via a brake circuit 2. A three-port, three-position selector valve 5 is provided at an intermediate position in the hydraulic brake circuit 2. The selector valve 5 can perform switching between a pressure increase state in which the upstream side (side of master cylinder 1) communicates with the downstream side (side of wheel cylinder 3), a pressure reduction state in which a brake fluid in the wheel cylinder 3 is caused to flow to a drain circuit 4, and a hold state in which a brake fluid pressure in the wheel cylinder 3 is held by shutting off the brake circuit 2. Therefore, the fluid pressure in the wheel cylinder 3 can be controlled arbitrarily based on the switching of the selector valve 5.

Also, the drain circuit 4 is provided with a reservoir 6 capable of storing the brake fluid. A circulating circuit 8 is provided to connect the reservoir 6 to an upstream position of the selector valve 5 in the brake circuit 2. The circulating circuit 8 is provided with a pump 7 for circulating the brake fluid stored in the reservoir 6 in the brake circuit 2.

Figure 3:
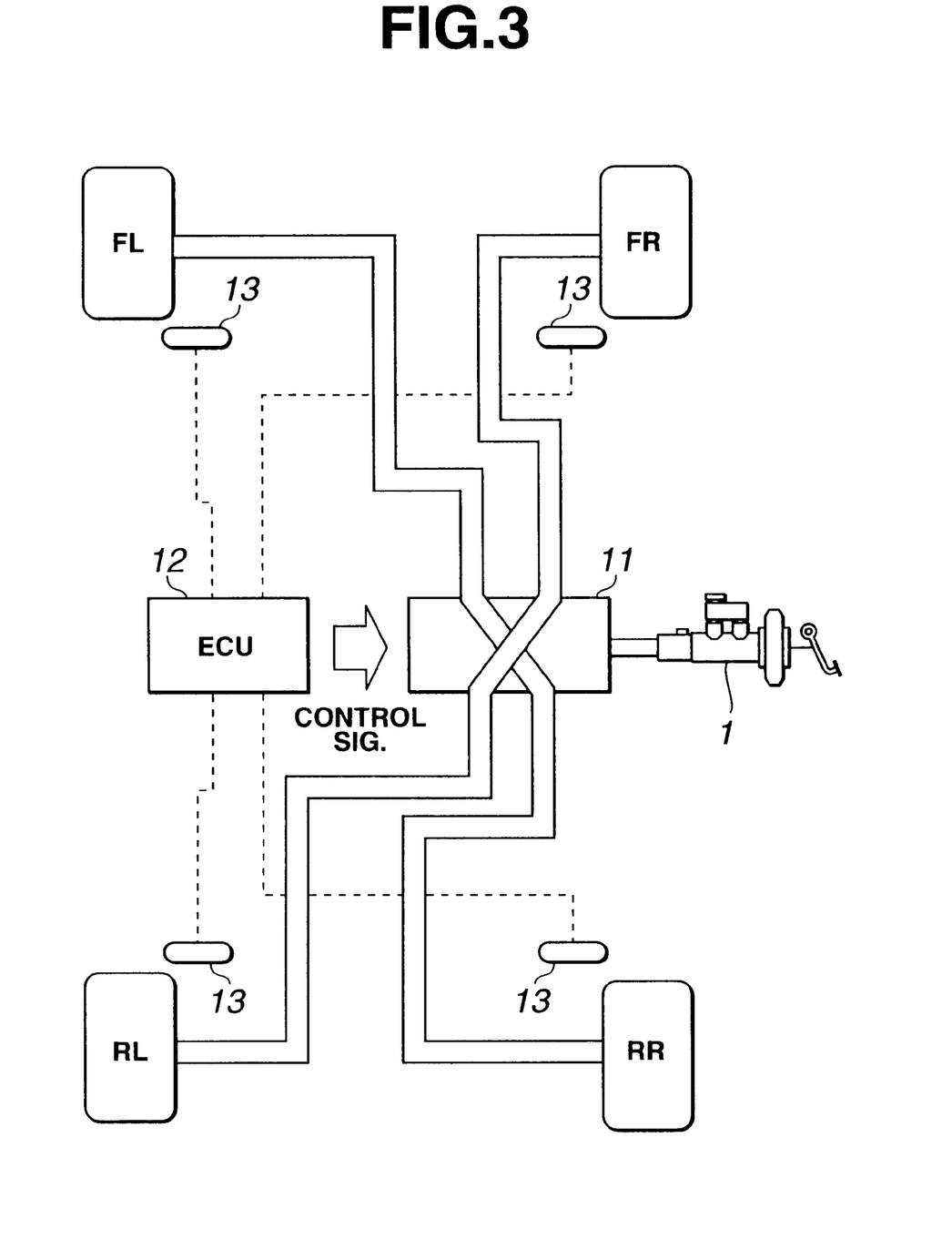
FIG. 3 is a general view of an embodiment.

A configuration in a range surrounded by the dash-and-dot line in FIG. 2 is reduced to a unit as a hydraulic brake unit 11. Although a configuration for one wheel is shown in FIG. 2, the whole configuration is as shown in FIG. 3. The brake unit 11 is configured so that the brake fluid pressure of each wheel cylinder 3 (not shown in FIG. 3) for four wheels FR, FL, RR and RL can be controlled independently. The vehicle to which this embodiment is applied is a rear-wheel-drive vehicle on which the rear wheels RR and RL are driving wheels.

The operations of the selector valve 5 and the pump 7 of the brake unit 11 are controlled by an electronic control unit (ECU) 12. The control unit 12 is provided, as input means, with wheel speed sensors 13, 13, 13, 13 for detecting a rotational speed of each of wheels FR, FL, RR and RL.

The following is a description of brake control executed by the system of the embodiment.

Figure 4:
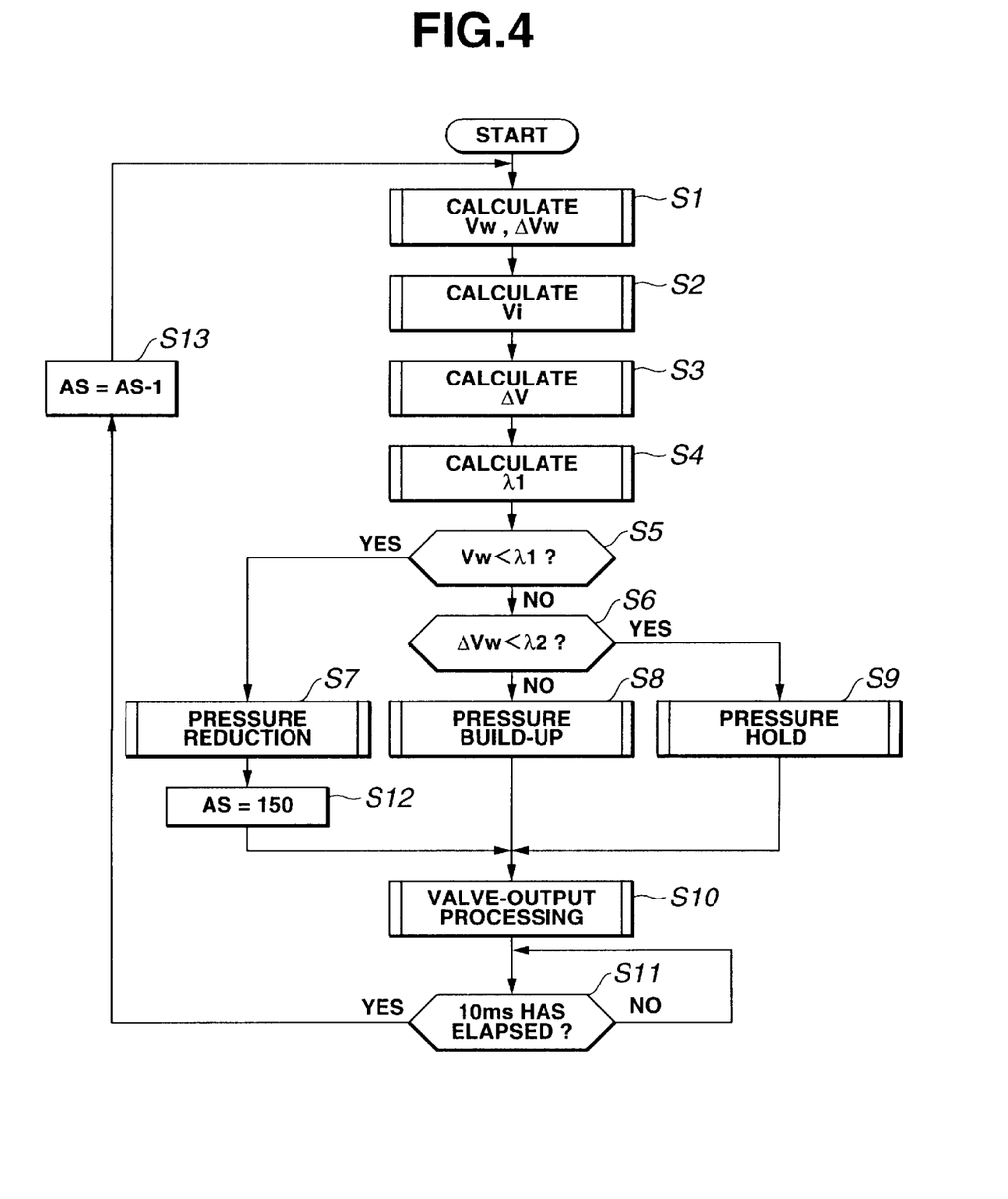
FIG. 4 is a flowchart showing a flow of ABS control in accordance with an embodiment.

In the brake control in accordance with this embodiment, what we call ABS control for controlling the brake fluid pressure for each wheel is carried out to prevent the wheel from locking during braking. FIG. 4 shows the general flow of the ABS control (skid control).

The skid-control routine shown in FIG. 4 is executed as time-triggered interrupt routines to be triggered every predetermined time intervals such as 10 msec. First, at Step S1, a sensor frequency is determined from the number of sensor pulses ND of each wheel speed sensor 13 generating at time periods of 10 msec and a time period TD, and a wheel speed Vw and a wheel acceleration $\Delta Vw$ are calculated. In the following description, when the characters of FR, FL, RR or RL are added after the characters Vw, the wheel speed of that wheel is indicated.

In Step S2, a pseudo vehicle body speed Vi is arithmetically calculated. This step S2 functions as a pseudo vehicle body speed generating section. Details of calculation for determining this pseudo vehicle body speed Vi will be hereinafter described in detail.

In Step S3, a vehicle body deceleration $\Delta V$ is calculated based on a time rate of change in the pseudo vehicle body speed Vi.

In Step S4, calculation for determining a pressure reduction threshold value $\lambda 1$ is performed. This pressure reduction threshold value $\lambda 1$ is a value such that a pressure reduction operating mode is effected if the wheel speed Vw becomes lower than this value $\lambda 1$. For example, this value $\lambda 1$ is determined from the following equation based on a select wheel speed Vfs, which is the highest value of wheel speeds of four wheels.

$$\lambda 1 = A \cdot Vfs - B$$

where A and B are arbitrary coefficients which are set at values such that the pressure reduction threshold value $\lambda 1$ is a value somewhat lower than the select wheel speed Vfs and a slip ratio suitable for obtaining a braking force is provided.

In Step S5, a check is made to determine whether or not the wheel speed Vw is lower than the pressure reduction threshold value $\lambda 1$. If the wheel speed Vw is lower than the pressure reduction threshold value $\lambda 1$, the program proceeds to Step S7, where the selector valve 5 is switched to a pressure reduction state or a pressure-reduction valve position, so that pressure reduction control for decreasing the wheel cylinder pressure is executed. In this case, the program further proceeds to Step S12, where the output of an ABS control signal AS, which indicates that ABS control is being executed, is set at 150.

On the other hand, if the judgment result of Step S5 is No (in the case of Vw>λ1), the program proceeds to Step S6, where it a check is made to determine whether or not the wheel acceleration ΔVw is lower than a predetermined pressure hold threshold value λ2 set in advance. If the answer to Step S6 is No (that is, ΔVw≧λ2), the wheel speed is assumed to return, and the program proceeds to Step S8, where pressure build-up control (the selector valve 5 is switched to a pressure build-up state or a pressure build-up valve position) is executed. On the other hand, if the judgment result is Yes (that is, ΔVw<λ2), the program proceeds to Step S9, where pressure hold control (the selector valve 5 is switched to a hold state or a hold pressure valve position) is executed. In the pressure build-up control and pressure hold control in Steps S8 and S9, respectively, the output processing to the selector valve 5 is performed in Step S10.

In control in Steps S7 to S9, command time periods TGEN and TZOU for each control are set. A control signal (or a control command) is output actually to the selector valve 5 in valve output processing in Step S10.

In Step S11, it is judged whether or not 10 ms has elapsed. If 10 ms has elapsed, the count of a timer AS for the ABS control signal is decremented by "1" in Step S13.

Next, a flow of processing for the pseudo vehicle body speed arithmetic-calculation in Step S2 will be described with reference to a flowchart of FIG. 5.

First, in Step 100, it is judged whether or not an abnormality counter KDECTFR of right front wheel, mentioned later, exceeds an abnormality judgment pressure reduction time period TG, and an abnormality counter KDECTFL of left front wheel exceeds the abnormality judgment pressure reduction time period TG, and a pressure build-up counter CONTAMODE exceeds a set value Y. If the judgment result is Yes, the program proceeds to Step 103. On the other hand, if the judgment result is No, the program proceeds to Step 101.

For the purpose of precise abnormality judgment, it is preferable to set the above-mentioned abnormality judgment pressure reduction time period TG compared to the counted value of the abnormality counter at a time period longer than 500 msec. For the same reason, it is preferable to set the set value compared to the counted value of the pressure build-up counter at a time period longer than 500 msec.

In Step 101, it is judged whether or not the abnormality counter KDECTFR of right front wheel exceeds the abnormality judgment pressure reduction time period TG, and an abnormality counter KDECTR of rear wheel exceeds the abnormality judgment pressure reduction time period TG. If the judgment result is Yes, the program proceeds to Step 103. On the other hand, if the judgment result is No, the program proceeds to Step 102. In Step 102, the abnormality counter KDECTFL of left front wheel exceeds the abnormality judgment pressure reduction time period TG, and the abnormality counter KDECTR of rear wheel exceeds the abnormality judgment pressure reduction time period TG. If the judgment result is Yes, the program proceeds to Step 103, and if the judgment result is No, the program proceeds to Step 104.

In Step 103, to which the program proceeds if the judgment result is Yes in any of Steps 100, 101 and 102, processing in which an abnormality confirmation signal SVW_AB is set (=1) is performed.

If the abnormality confirmation signal SVW_AB is set (abnormality occurs) based on the processing in Steps 100 to 103, processing in which the select wheel speed Vfs is made a third value 3rdVw of the wheel speeds of four wheels is performed in Step 105. On the other hand, if the abnormality confirmation signal SVW_AB is not set (normal time when abnormality does not occur), processing in which the select wheel speed Vfs is made a highest value maxVw of the wheel speeds Vw of four wheels is performed in Step 106. In other words, if abnormality is found, the select wheel speed Vfs is generated in Step 105, and if normality is found, the select wheel speed Vfs is generated in Step 106.

Subsequently, in Step 107, it is judged whether or not the abnormality confirmation signal SVW_AB is not generated at the previous control cycle, and it is generated at the present control cycle. In Step 107, $SVW\_AB_{(n-1)}$ denotes the previous value of the abnormality confirmation signal SVW_AB, whereas SVW_AB denotes the current value $SVW\_AB_{(n)}$ of the abnormality confirmation signal. If the abnormality confirmation signal SVW_AB is generated first at the present control cycle, the program proceeds to Step 108, where processing in which the pseudo vehicle body speed Vi is made the select wheel speed Vfs is performed. On the other hand, if the abnormality confirmation signal SVW_AB is not generated first at the present control cycle in Step 107, the program proceeds to Step 109, where it is judged whether or not the pseudo vehicle body speed Vi is higher than the select wheel speed Vfs. If Vi>Vfs, the wheel speed is decreasing, and the program proceeds to Step 110, where processing in which the pseudo vehicle body speed Vi is made equal to Vi−ΔV is performed. The value ΔV is an estimated value of vehicle deceleration, and is estimated from a time rate of change in the pseudo vehicle body speed Vi. On the other hand, the judgment result in Step 109 is No, that is, if Vi≦Vfs, the wheel speed is returning, and the program proceeds to Step 111, where the pseudo vehicle body speed Vi is determined by Vi+Z. The character z denotes a preset acceleration limiter value.

Thereafter, in Steps 112 and 113, processing in which the abnormality confirmation signal SVW_AB is reset by the output stop of ABS control signal is performed.

Figure 6:
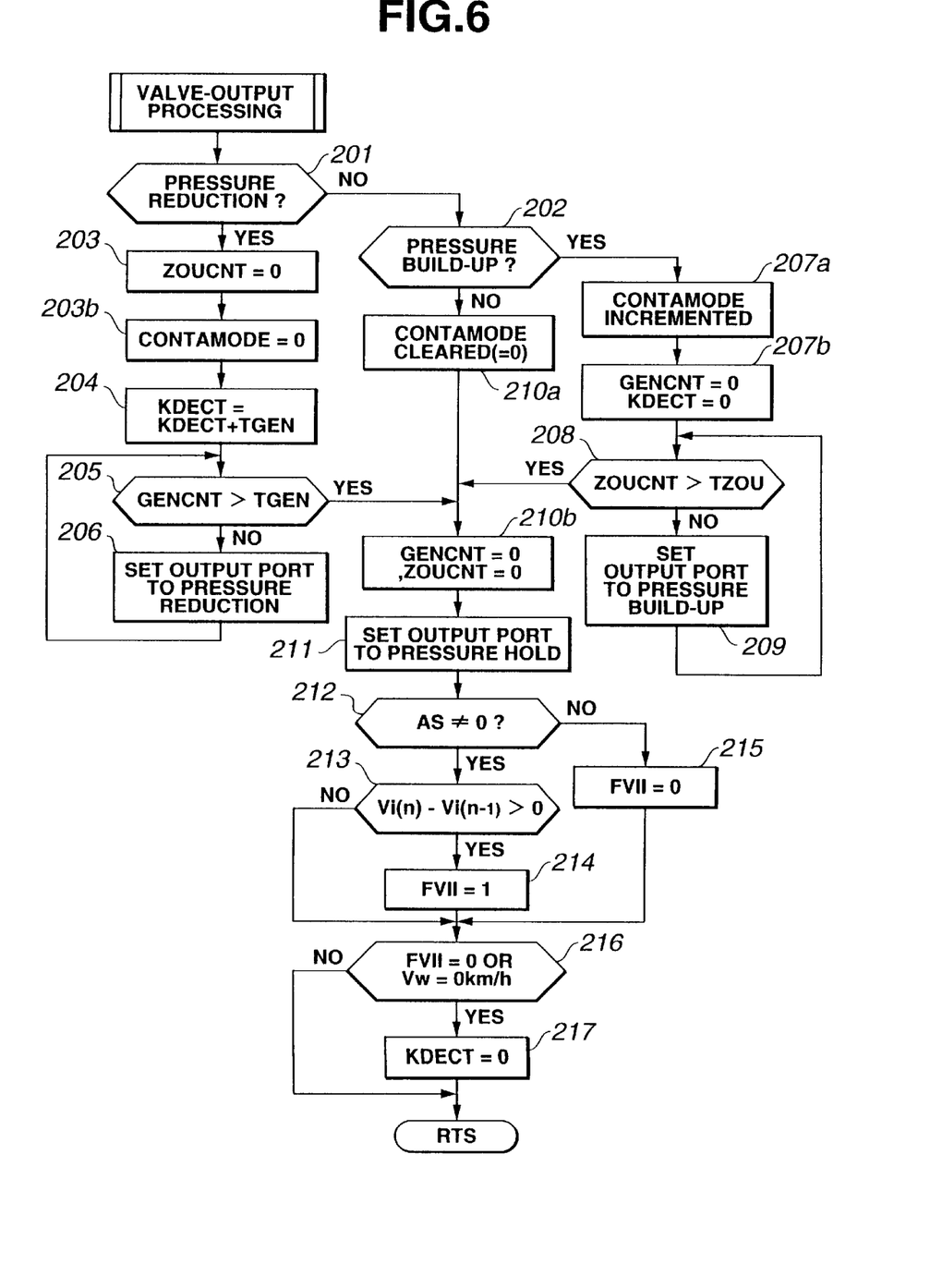
FIG. 6 is a flowchart showing a flow of valve output processing of a rear wheel in accordance with an embodiment.

Next, the valve output processing in Step S10 will be described in detail with reference to a flowchart of FIG. 6.

First, in Steps 201 and 202, it is judged whether or not a pressure reduction command and a pressure build-up command are issued, respectively. If the pressure reduction command is issued, the program proceeds to Step 203, and if the pressure build-up command is issued, the program proceeds to Step 207a. If neither the pressure reduction command nor the pressure build-up command is issued, the program proceeds to Step 210a.

In Step 203, to which the program proceeds if the pressure reduction command is issued, a pressure build-up counter ZOUCNT is reset to 0, and in the subsequent Step 203b, processing in which a pressure build-up counter CONTAMODE indicating that pressure build-up is effected is made equal to 0 is performed. Further, in Step 204, processing in which an abnormality counter KDECT is made KDECT+TGEN is performed. Next, in Steps 205 and 206, processing in which an output port is set to its pressure reduction state until the count value of a pressure reduction counter GENCNT exceeds the pressure reduction command value TGEN is performed. If the pressure reduction command value TGEN exceeds the count value of the pressure reduction counter GENCNT, the program proceeds to Step 210b.

On the other hand, in Step 207a, to which the program proceeds if the pressure build-up command is issued, the pressure build-up counter CONTAMODE is counted up, and further in Step 207b, the pressure reduction counter GENCNT and the abnormality counter KDECT are reset to 0. In the subsequent Steps 208 and 209, processing in which the output port is set to its pressure build-up state until the count value of the pressure build-up counter ZOUCNT exceeds the pressure build-up command time period TZOU is performed. If the pressure reduction command time period TGEN exceeds the count value of the pressure reduction counter GENCENT, the program proceeds to Step 210.

If neither the pressure reduction command nor the pressure build-up command is issued, the pressure build-up counter CONTAMODE is cleared to "0" in Step 210*a*, and the program proceeds to Step 210*b*, where the pressure reduction counter GENCENT and the pressure build-up counter ZOUCNT are reset to 0. In the subsequent step 211, the output port is set to its pressure hold state.

The above-described steps 201 to 211 represent a flow of processing for controlling to each state only for a commanded time period decided in Steps S7 to S9.

In Step 212, it is judged whether or not the ABS control signal AS is set. If the judgment result is Yes, the program proceeds to Step 213, and if the judgment result is No, the program proceeds to Step 215.

In Step 213, to which the program proceeds if the ABS control signal AS is set, it is judged whether or not a value obtained by subtracting the previous (10 ms before) pseudo vehicle body speed Vi from the present pseudo vehicle body speed Vi is positive, that is, whether or not the vehicle is being accelerated. In Step 213, $Vi_{(n)}$ denotes the current value of the pseudo vehicle body speed Vi, while $Vi_{(n-1)}$ denotes the previous value of the pseudo vehicle body speed Vi, calculated or generated one cycle before. If the judgment result is Yes, an acceleration flag FVII is set to 1.

In the subsequent steps 216 and 217, if the acceleration flag FVII is not set, or if the wheel speed Vw is 0 km/h, processing in which the abnormality counter KDECT is set to 0 is performed.

Figure 5:
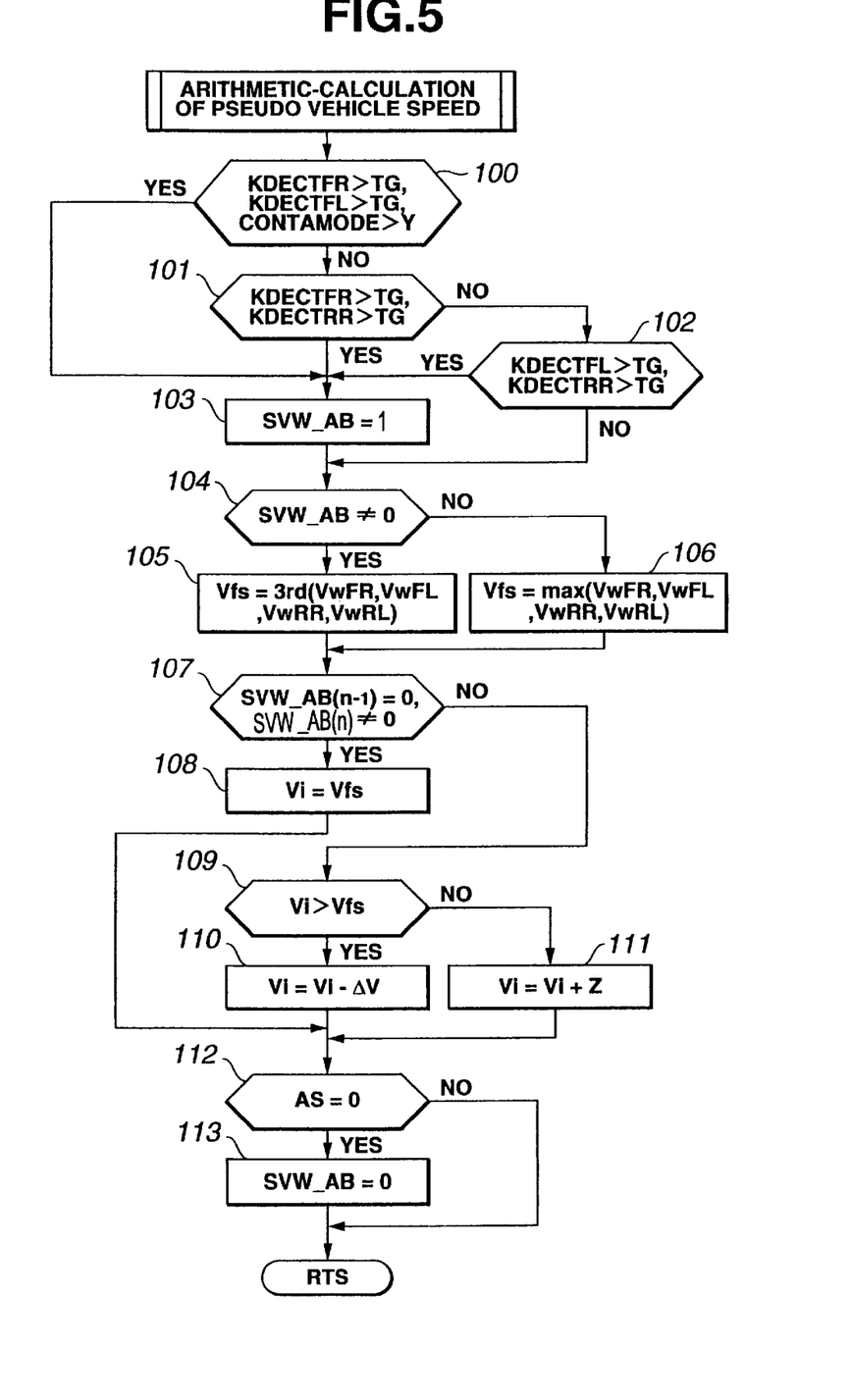
FIG. 5 is a flowchart showing a flow of pseudo vehicle body speed calculation in accordance with an embodiment.

That is to say, the abnormality counter KDECT, which is a basis for abnormality judgment executed in Steps 101 and 102 in FIG. 5, is counted in the valve output processing in the above-described steps 201 to 217. If the ABS control signal is being output (AS=0), AS=0 is changed over to AS≠0 and the pseudo vehicle body speed Vi is accelerated once (FVII=1), the wheel speed Vw of the wheel, which is subjected to skid control, is higher than 0 km/h, and the pressure of the wheel, which is subjected to skid control, is being reduced, the abnormality counter KDECT is counted. On the other hand, if the ABS control signal is not output (AS≠0), or the wheel speed Vw of the wheel concerned is 0 km/h, or the pressure of the wheel, which is subjected to skid control, is being built up (CONTAMODE=0), the abnormality counter KDECT is cleared.

Next, the operation of the system of the embodiment will be described with reference to time charts of FIGS. 7A–7C and 8A–8G.

Figure 7A:
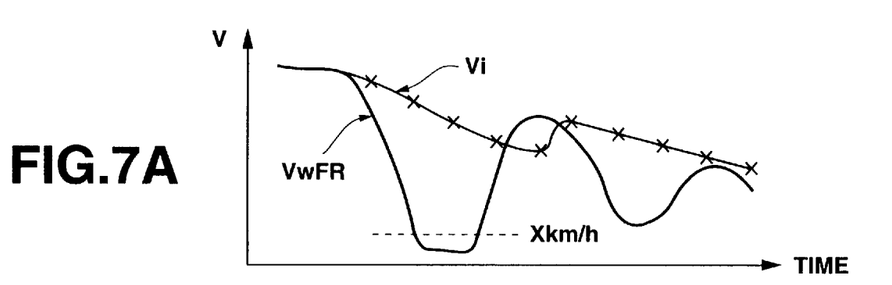
FIGS. 7A–7C are time charts showing an example of normal operation of a wheel speed sensor in accordance with an embodiment.
Figure 7B:
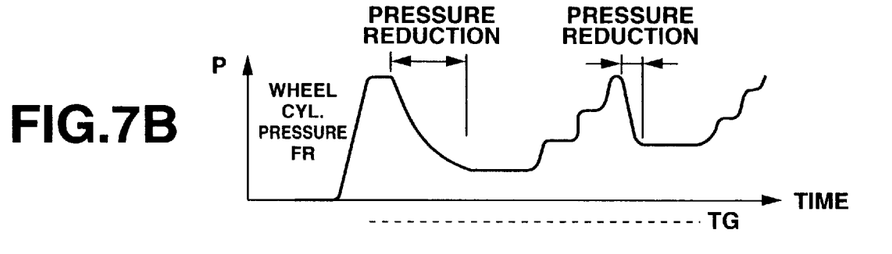
Figure 7C:
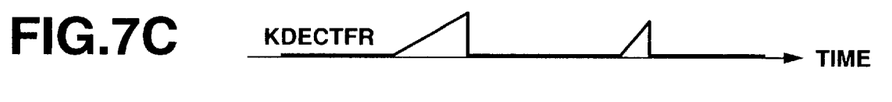
Figures 8A, 8B:
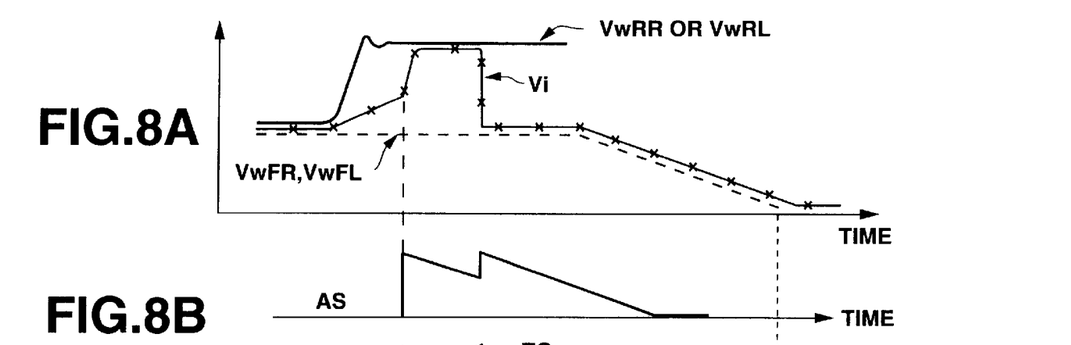
FIGS. 8A–8G are time charts showing an example of abnormal operation of a wheel speed sensor in accordance with an embodiment.
Figures 8C, 8D:
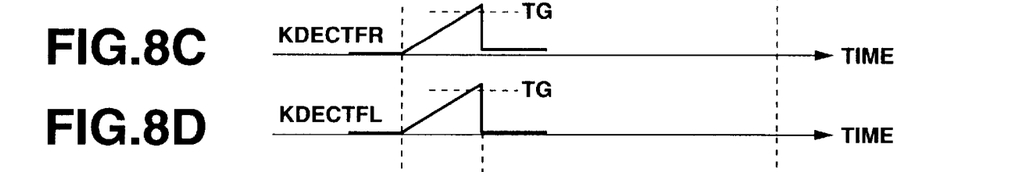
Figure 8E:
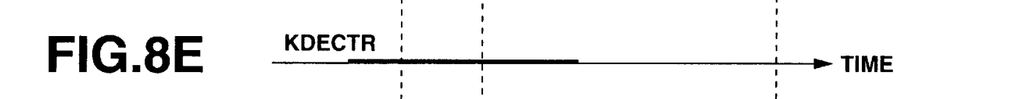
Figure 8F:
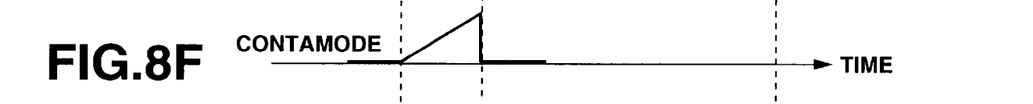
Figure 8G:
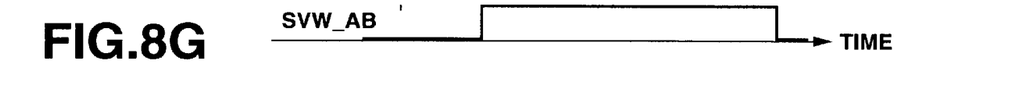

The time charts of FIGS. 7A–7C show test results of skid control of the front right wheel in the case where normal control is carried out without occurrence of abnormality in the wheel speed sensor 13. As shown in FIGS. 7A–7C, at the beginning of braking action, the wheel speed VwFR of the front right wheel is decreased greatly due to a low-$\mu$ road etc., so that the front-right wheel-brake cylinder pressure is reduced according to ABS control operation. Also, when the wheel speed Vw is recovered by the pressure reduction operating mode, it becomes higher than the pseudo vehicle body speed Vi.

As shown in FIG. 7A, when the wheel speed Vw becomes higher than the pseudo vehicle body speed Vi, there is conventionally a possibility of abnormality judgment. In the system of the embodiment, however, the abnormality counter KDECT, which is a basis for abnormality judgment, is counted when the pressure reduction operating mode is executed during skid control, but this counting is performed only for one pressure reduction processing. Moreover, after the ABS control signal AS is set, the counter is cleared during one cycle of the skid control routine, if the setting of the acceleration flag FVII to "1", occurring due to a rise in the pseudo vehicle body speed Vi, is not made.

In the system of the embodiment, therefore, in such a normal operation of ABS, the abnormality counter KDECT is not counted over a plurality of control cycles, so that the count value does not exceed the abnormality judgment pressure reduction time period TG. Thereupon, mistaken judgment of abnormality is not made.

The time charts of FIGS. 8A–8G show a case where abnormality occurs in the wheel speed sensor 13 for rear wheel during constant-speed running before deceleration is executed and one of the wheel speeds VwRR and VwRL of rear wheels increases significantly. In this case, the select wheel speed Vfs tends to increase by the sensor abnormality, by which the pseudo vehicle body speed Vi also increases.

If the pseudo vehicle body speed Vi is increased in this manner, the wheel speeds VwFR and VwRL of front wheels, which are normal wheels, take a greatly low value in comparison with the pseudo vehicle body speed Vi. As a result, ABS control is initiated on these front wheels (output of ABS control signal is started). In this case, simultaneously with the initiation of ABS control, the flow of Step 212→213→214 in the flowchart of FIG. 6 is executed, so that the acceleration flag FVII is set. As a result, the program does not proceed from Step 216 to 217. Therefore, the abnormality counter KDECT counted by the flow of Step 201→203→203*b*→204 is not cleared by way of the execution of the pressure reduction operating mode, and is counted over a plurality of control cycles, so that the count value of the abnormality counter KDECT increases as shown in the time charts of FIG. 8A–8G. If the count value of the abnormality counter for the front wheel exceeds the abnormality judgment pressure reduction time period TG, and the count value of the pressure build-up counter CONTAMODE exceeds the set value Y, or the count value of the abnormality counter KDECT exceeds the abnormality judgment pressure reduction time period TG for both of front and rear wheels, the judgment result becomes Yes in any of Steps 100 to 102, so that the abnormality confirmation signal SVW_AB is set (see FIG. 8G). Therefore, the select wheel speed Vfs is calculated or generated on the basis of three wheel-speed sensor signals except the abnormal wheel-speed sensor signal, and the pseudo vehicle body speed Vi is generated based on the select wheel speed Vfs calculated as discussed above.

As described above, in the system of the embodiment, the judgment as to whether or not abnormality occurs in the wheel speed sensor 13 is made based on the length of time of the pressure reduction operating mode for the wheel, which is subjected to skid control, executed after the pseudo vehicle body speed Vi increases once during the ABS control. The count of this time is cleared when the pressure build-up operating mode is executed, ABS control is terminated, or the wheel speed is reduced to below a predetermined low speed such as 0 km/h. Note that the "pressure build-up operating mode" includes both (i) a moderate pressure build-up mode in which the wheel-brake cylinder pressure is moderately built up, and (ii) a quick pressure build-up mode in which the wheel-brake cylinder pressure is quickly built up. Therefore, as in the case where ABS control is carried out on a low-$\mu$ road, even if the wheel speed recovered from the wheel-lockup state by the pressure reduction operating mode becomes a value higher than the pseudo vehicle body speed Vi calculated based on the time rate of change ΔVi in the pseudo vehicle body speed, sensor abnormality judgment is not made, so that the abnormality judgment accuracy is improved, and thereby the control quality can be enhanced.

Similarly, even when the driving wheel slips and the wheel speed Vw exceeds the pseudo vehicle body speed Vi, the abnormality counter KDECT is not counted. Therefore, abnormality decision is not made, so that, like the above-described case, the abnormality judgment accuracy is improved, and thereby the control quality can be enhanced.

In addition, since the abnormality counter KDECT is cleared when the wheel speed Vw is 0 km/h as described above, even if the skid-control operation based on the normal operation of ABS such that the travel road is changed from a high-$\mu$ road to a low-$\mu$ road during braking, and the pressure reduction time increases just before stoppage is performed, this is not judged mistakenly to be abnormal.

Further, in the system of the embodiment, as shown in Step 100 in FIG. 5, if the count value of the abnormality counter KDECT for front wheel exceeds the abnormality judgment pressure reduction time period TG, and the pressure build-up time for rear wheel exceeds the set value Y, abnormality judgment is made. Therefore, the wheel-cylinder pressure of rear wheel only is built up and thus the time period for the vehicle attitude to become an unstable state is shortened, and whereby the vehicle attitude can be stabilized.

The above-described embodiment has shown an example in which in clearing the count value of the abnormality counter KDECT when the output value of the wheel speed sensor 13 becomes a value not higher than a predetermined low speed, the predetermined low speed is made 0 km/h. However, the predetermined low speed may be 10 km/h or 5 km/h, for example.

Also, FIG. 2 has shown a configuration in which pressure reduction, pressure hold, and pressure build-up operating modes of the wheel cylinder 3 are cyclically effected by one selector valve 5. However, in place of the selector valve 5, a normally-open two position switching inflow valve capable of opening/closing the brake circuit 2 and a normally-closed two position switching outflow valve capable of opening/closing the drain circuit 4 may be used.

Figure 1:
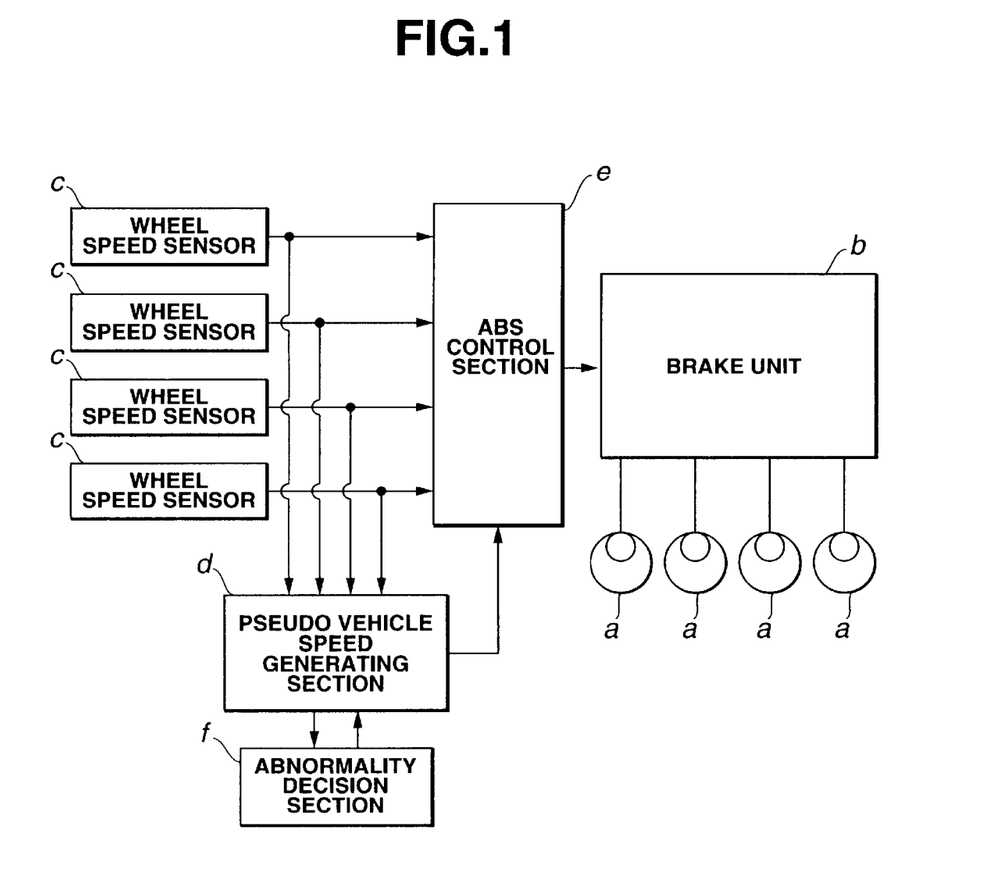
FIG. 1 is a block diagram showing an automotive brake control system in accordance with the present invention.

Returning to FIG. 1, there is shown the fundamental concept of the system of the present invention. As seen in FIG. 1, in the automotive brake control system of the invention, a hydraulic brake unit b is connected to each individual wheel cylinder a for individually controlling a wheel cylinder pressure to the individual wheel cylinder. Wheel speed sensors c detect wheel speeds of each of road wheels. A control unit is configured to be electrically connected to the wheel-speed sensors c and the hydraulic brake unit b, for processing wheel-speed sensor signals from the wheel-speed sensors and generating a command signal to the hydraulic brake unit to prevent wheel lock-up. The control unit includes a pseudo vehicle body speed generating section d which generates a pseudo vehicle body speed based on the wheel-speed sensor signals, and a skid control section (ABS control section) e which executes skid control based on the difference between the pseudo vehicle body speed and each of the wheel-speed sensor signals, to prevent wheel lock-up during braking by momentarily reducing the wheel-cylinder pressure through the hydraulic brake unit b, and an abnormality judgment section f which determines whether an abnormal wheel-speed sensor signal is included in the wheel-speed sensor signals from the wheel-speed sensors c. The abnormality judgment section f cooperates with the pseudo vehicle body speed generating section d for generating the pseudo vehicle body speed based on the wheel-speed sensor signals except the abnormal wheel-speed sensor signal when the abnormality judgment section f determines that the abnormal wheel-speed sensor signal is present. The abnormality judgment section f includes a pressure-reduction time counter which measures a pressure-reduction time from a time when a pressure-reduction operating mode is initiated due to a rise in the pseudo vehicle body speed during the skid control, and an abnormality decision circuitry which determines that the abnormal wheel-speed sensor signal is present when the pressure-reduction time exceeds a predetermined time period. It is preferable that the abnormality judgment section f inhibits the pressure-reduction time counter from measuring the pressure-reduction time, when a signal value of each of the wheel-speed sensor signals is reduced to below a predetermined low speed. More preferably, the abnormality judgment section f operates so that the pressure-reduction time measured by the pressure-reduction time counter is cleared to zero, when either one of a first condition where a pressure build-up operating mode is executed during the skid control and a second condition where the skid control is terminated is satisfied. Furthermore, it is preferable that the abnormality decision circuitry of the abnormality judgment section determines that the abnormal wheel-speed sensor signal is present, when the pressure-reduction time measured for a front wheel of the road wheels and the pressure-reduction time measured for a rear wheel of the road wheels both exceed the predetermined time period. Moreover, it is preferable that the abnormality decision circuitry of the abnormality judgment section determines that the abnormal wheel-speed sensor signal is present, when the pressure-reduction time measured for a front wheel of the road wheels exceeds a first predetermined time period and additionally a pressure build-up time measured for a rear wheel of the road wheels exceeds a second predetermined time period.

As described above, according to the system of the invention, when the pressure-reduction operating mode is effected as the pseudo vehicle body speed increases at the time of execution of ABS control, the pressure-reduction time is measured, and abnormality judgment or abnormality decision is made when the measured time has elapsed exceeding a predetermined time period, so that even if the normal wheel speed value exceeds a pseudo vehicle body speed estimated in the first cycle of control at the time of braking on a low-$\mu$ road, deceleration is not effected, and therefore abnormality judgment is not made. Also, if abnormality occurs in the wheel speed sensor, this abnormality is detected during ABS control, and adverse effect due to sensor abnormality is not produced in ABS control. Therefore, the abnormality judgment accuracy is improved as compared with the conventional brake control system, whereby the control quality can be enhanced.

Also, the system of the invention can prevent mistaken judgment such that normal ABS control is taken as abnormality of wheel speed sensor, and thereby can enhance the control quality.

Also, the system of the invention can improve the judgment accuracy for abnormality occurrence.

Also, the system of the invention can prevent the vehicle attitude from becoming unstable.

The entire contents of Japanese Patent Application No. P11-145218 (filed May 25, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive brake control system comprising:
   a hydraulic brake unit connected to each of a plurality of individual wheel cylinders, for individually controlling a wheel-cylinder pressure to the individual wheel cylinders;
   wheel-speed sensors detecting wheel speeds of each of a plurality of road wheels; and
   a control unit being configured to be electrically connected to the wheel-speed sensors and said hydraulic brake unit, for processing wheel-speed sensor signals from said wheel-speed sensors and generating a command signal to said hydraulic brake unit to prevent wheel lock-up, said control unit comprising:
   (a) a pseudo vehicle body speed generating section generating a pseudo vehicle body speed based on the wheel-speed sensor signals,
   (b) a skid control section executing skid control based on a difference between the pseudo vehicle body speed and each of the wheel-speed sensor signals, to prevent wheel lock-up during braking by momentarily reducing the wheel-cylinder pressure through said hydraulic brake unit, and
   (c) an abnormality judgment section determining whether an abnormal wheel-speed sensor signal is included in the wheel-speed sensor signals from the wheel-speed sensors, and cooperating with said pseudo vehicle body speed generating section for generating the pseudo vehicle body speed based on the wheel-speed sensor signals except the abnormal wheel-speed sensor signal when said abnormality judgment section determines that the abnormal wheel-speed sensor signal is present, said abnormality judgment section including:
   (1) a pressure-reduction time counter which measures a pressure-reduction time from a time when a pressure-reduction operating mode is initiated due to a rise in the pseudo vehicle speed during the skid control;
   (2) an abnormality decision circuitry which determines that the abnormal wheel-speed sensor signal is present when the pressure-reduction time exceeds a predetermined time period, and
   wherein said abnormality judgment section inhibits said pressure-reduction time counter from measuring the pressure-reduction time, when a signal value of each of the wheel-speed sensor signals is reduced to below a predetermined low speed.

2. The automotive brake control system as claimed in claim 1, wherein said abnormality judgment section operates so that the pressure-reduction time measured by said pressure-reduction time counter is cleared to zero, when either one of a first condition that a pressure build-up operating mode is executed during the skid control and a second condition that the skid control is terminated is satisfied.

3. The automotive brake control system as claimed in claim 1, wherein said abnormality decision circuitry of said abnormality judgment section determines that the abnormal wheel-speed sensor signal is present, when the pressure-reduction time measured for a front wheel of the road wheels and the pressure-reduction time measured for a rear wheel of the road wheels both exceed the predetermined time period.

4. An automotive brake control system comprising:
   a hydraulic brake unit connected to each of a plurality of individual wheel cylinders, for individually controlling a wheel-cylinder pressure to the individual wheel cylinders;
   wheel-speed sensors detecting wheel speeds of each of a plurality of road wheels; and
   a control unit being configured to be electrically connected to the wheel-speed sensors and said hydraulic brake unit, for processing wheel-speed sensor signals from said wheel-speed sensors and generating a command signal to said hydraulic brake unit to prevent wheel lock-up, said control unit comprising:
   (a) a pseudo vehicle body speed generating section generating a pseudo vehicle body speed based on the wheel-speed sensor signals,
   (b) a skid control section executing skid control based on a difference between the pseudo vehicle body speed and each of the wheel-speed sensor signals, to prevent wheel lock-up during braking by momentarily reducing the wheel-cylinder pressure through said hydraulic brake unit, and
   (c) an abnormality judgment section determining whether an abnormal wheel-speed sensor signal is included in the wheel-speed sensor signals from the wheel-speed sensors, and cooperating with said pseudo vehicle body speed generating section for generating the pseudo vehicle body speed based on the wheel-speed sensor signals except the abnormal wheel-speed sensor signal when said abnormality judgment section determines that the abnormal wheel-speed sensor signal is present, said abnormality judgment section including:
   (1) a pressure-reduction time counter which measures a pressure-reduction time from a time when a pressure-reduction operating mode is initiated due to a rise in the pseudo vehicle speed during the skid control;
   (2) an abnormality decision circuitry which determines that the abnormal wheel-speed sensor signal is present when the pressure-reduction time exceeds a predetermined time period, and
   wherein said abnormality decision circuitry of said abnormality judgment section determines that the abnormal wheel-speed sensor signal is present, when the pressure-reduction time measured for a front wheel of the road wheels exceeds a first predetermined time period and additionally a pressure build-up time measured for a rear wheel of the road wheels exceeds a second predetermined time period.

5. An automotive brake control system comprising:
   a hydraulic brake unit connected to each of a plurality of individual wheel cylinders, for individually controlling a wheel-cylinder pressure to the individual wheel cylinders;
   a plurality of wheel-speed sensors detecting wheel speeds of a plurality of road wheels; and
   a control unit configured to be electrically connected to the wheel-speed sensors and said hydraulic brake unit, for processing wheel-speed sensor signals from said wheel-speed sensors and generating a command signal to said hydraulic brake unit to prevent wheel lock-up, said control unit comprising:

(a) a pseudo vehicle body speed generating means for generating a pseudo vehicle body speed based on the wheel-speed sensor signals, (b) a skid control means for executing skid control based on a difference between the pseudo vehicle body speed and each of the wheel-speed sensor signals, to prevent wheel lock-up during braking by momentarily reducing the wheel-cylinder pressure through said hydraulic brake unit, and (c) an abnormality judgment means for determining whether an abnormal wheel-speed sensor signal is included in the wheel-speed sensor signals from the wheel-speed sensors, and cooperating with said pseudo vehicle body speed generating means for generating the pseudo vehicle body speed based on the wheel-speed sensor signals except the abnormal wheel-speed sensor signal when said abnormality judgment means determines that the abnormal wheel-speed sensor signal is present, said abnormality judgment means comprising:

(1) a pressure-reduction time counter which measures a pressure-reduction time from a time when a pressure-reduction operating mode is initiated due to a rise in the pseudo vehicle speed during the skid control; and (2) an abnormality decision circuitry which determines that the abnormal wheel-speed sensor signal is present when the pressure-reduction time exceeds a predetermined time period; and said abnormality judgment means inhibiting said pressure-reduction time counter from measuring the pressure-reduction time, when a signal value of each of the wheel-speed sensor signals is reduced to below a predetermined low speed.

6. The automotive brake control system as claimed in claim 5, wherein said abnormality judgment means operates so that the pressure-reduction time measured by said pressure-reduction time counter is cleared to zero, when either one of a first condition that a pressure build-up operating mode is executed during the skid control and a second condition that the skid control is terminated is satisfied.

7. The automotive brake control system as claimed in claimed 5, wherein said abnormality decision circuitry of said abnormality judgment means determines that the abnormal wheel-speed sensor signal is present, when the pressure-reduction time measured for a front wheel of the road wheels and the pressure-reduction time measured for a rear wheel of the road wheels both exceed the predetermined time period.

8. An automotive brake control system comprising:

a hydraulic brake unit connected to each of a plurality of individual wheel cylinder, for individually controlling a wheel-cylinder pressure to the individual wheel cylinders;

wheel-speed sensors detecting wheel speeds of a plurality of road wheels; and a control unit being configured to be electrically connected to the wheel-speed sensors and said hydraulic brake unit, for processing wheel-speed sensor signals from said wheel-speed sensors and generating a command signal to said hydraulic brake unit to prevent wheel lock-up, said control unit comprising:

(a) a pseudo vehicle body speed generating means for generating a pseudo vehicle body speed based on the wheel-speed sensor signals, (b) a skid control means for executing skid control based on a difference between the pseudo vehicle body speed and each of the wheel-speed sensor signals, to prevent wheel lock-up during braking by momentarily reducing the wheel-cylinder pressure through said hydraulic brake unit, and (c) an abnormality judgment means for determining whether an abnormal wheel-speed sensor signal is included in the wheel-speed sensor signals from the wheel-speed sensors, and cooperating with said pseudo vehicle body speed generating means for generating the pseudo vehicle body speed based on the wheel-speed sensor signals except the abnormal wheel-speed sensor signal when said abnormality judgment means determines that the abnormal wheel-speed sensor signal is present, said abnormality judgment means comprising:

(1) a pressure-reduction time counter which measures a pressure-reduction time from a time when a pressure-reduction operating mode is initiated due to a rise in the pseudo vehicle speed during the skid control; and (2) an abnormality decision circuitry which determines that the abnormal wheel-speed sensor signal is present when the pressure-reduction time exceeds a predetermined time period; and said abnormality decision circuitry of said abnormality judgment means determines that the abnormal wheel-speed sensor signal is present, when the pressure-reduction time measured for a front wheel of the road wheels exceeds a first predetermined time period and additionally a pressure build-up time measured for a rear wheel of the road wheels exceeds a second predetermined time period.

* * * * *